March 14, 1933.  J. P. COLEMAN  1,900,913
ELECTRICAL COUPLING DEVICE
Filed Feb. 2, 1931   2 Sheets-Sheet 1

INVENTOR:
J. P. Coleman,
by
his ATTORNEY.

March 14, 1933.  J. P. COLEMAN  1,900,913
ELECTRICAL COUPLING DEVICE
Filed Feb. 2, 1931   2 Sheets-Sheet 2

INVENTOR:
J. P. Coleman,
BY
ATTORNEY.

Patented Mar. 14, 1933

1,900,913

UNITED STATES PATENT OFFICE

JOHN P. COLEMAN, OF EDGEWOOD, PENNSYLVANIA, ASSIGNOR TO THE UNION SWITCH & SIGNAL COMPANY, OF SWISSVALE, PENNSYLVANIA, A CORPORATION OF PENNSYLVANIA

ELECTRICAL COUPLING DEVICE

Application filed February 2, 1931. Serial No. 512,977.

My invention relates to electrical coupling devices.

I will describe one form of coupling device embodying my invention, and will then point out the novel features thereof in claims.

Figure 1:
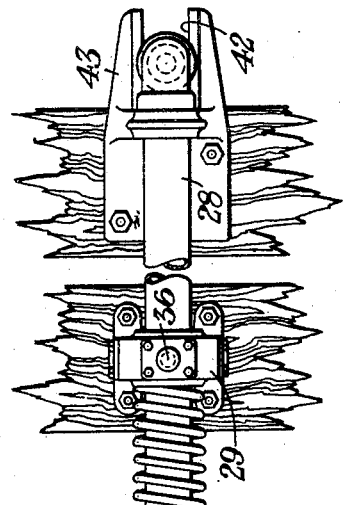
Figure 1:
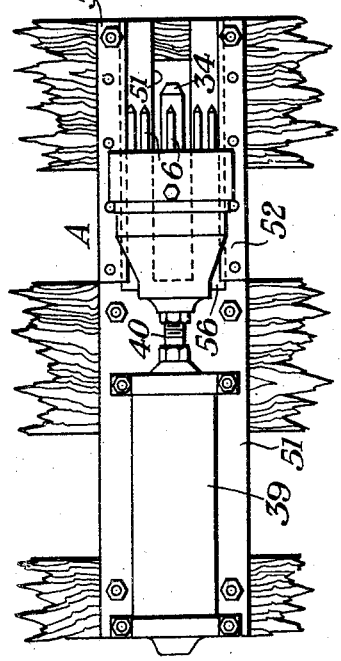
Figure 2:
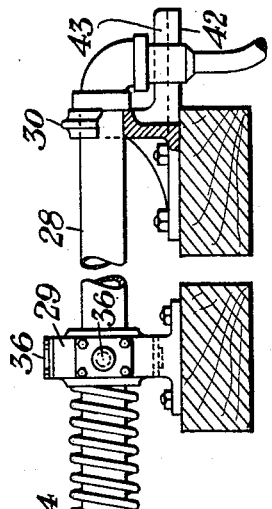
Figure 2:
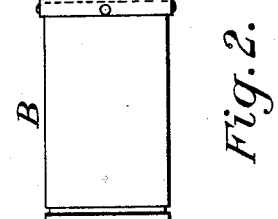
Figure 3:
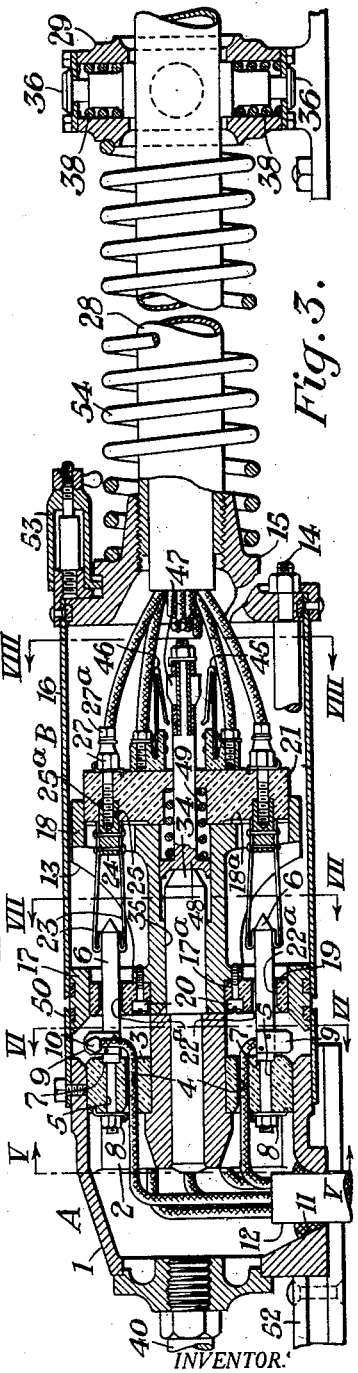
Figure 4:
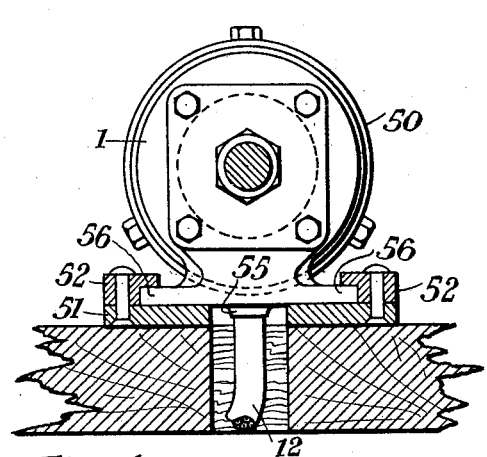
Figure 5:
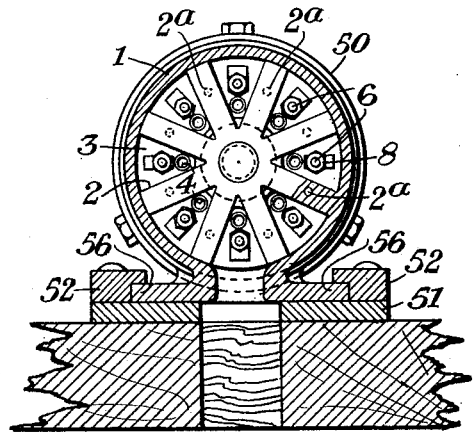
Figure 6:
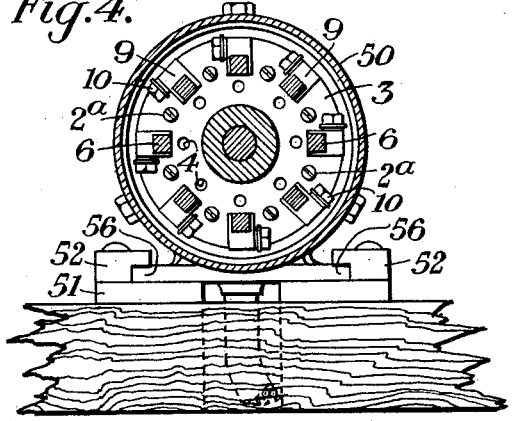
Figure 7:
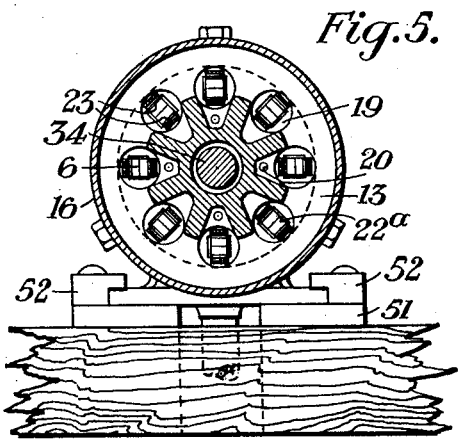
Figure 8:
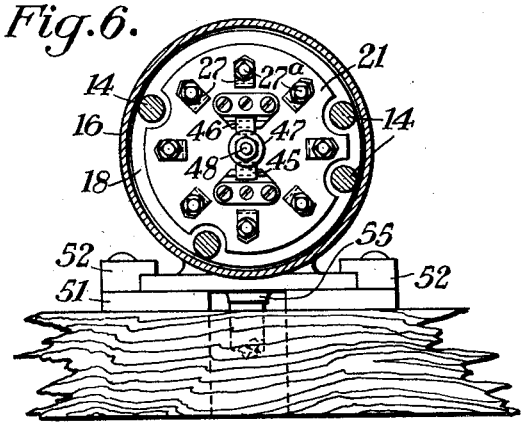
Figure 9:
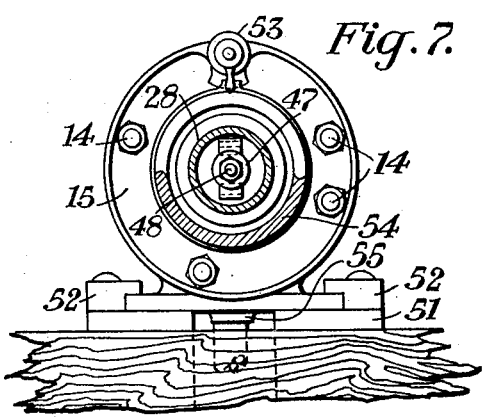

In the accompanying drawings, Fig. 1 is a top plan view showing a coupling device embodying my invention mounted on a drawbridge, the two coupling members being in their separated positions. Fig. 2 is a side view of the coupling device shown in Fig. 1 with the two coupling members in their joined positions and with certain of the parts shown in section to better illustrate the construction. Fig. 3 is a longitudinal vertical sectional view on a somewhat larger scale of the coupling device shown in Figs. 1 and 2. Fig. 4 is a left-hand end view of the coupling member A forming part of the coupling device shown in Figs. 1, 2 and 3. Fig. 5 is a sectional view on the line V—V of Fig. 3. Fig. 6 is a sectional view on the line VI—VI of Fig. 3. Fig. 7 is a sectional view on the line VII—VII of Fig. 3. Fig. 8 is a sectional view on the line VIII—VIII of Fig. 3. Fig. 9 is a right-hand end view of the coupling device shown in Fig. 3.

Similar reference characters refer to similar parts in each of the several views.

Referring to the drawings, a coupling device embodying my invention embraces two axially separable coupling members A and B which, as here shown, are mounted opposite each other on the fixed and draw spans, respectively, of a drawbridge, in a manner which will be described hereinafter.

As best seen in Fig. 3, the coupling member A comprises a suitable casing 1, preferably of substantially cylindrical configuration, formed with a spider 2 (see Fig. 5) to which is fastened in any convenient manner, as by studs 2ª, a circular plate 3 of suitable insulating material, such as fiber. The plate 3 is provided with a plurality of holes arranged in pairs in such manner that a pair of holes 4 and 5 is located between each two adjacent arms of the spider 2, and extending through the outer hole 5 of each pair is a suitable contacting member, here shown as a contact finger 6. Each contact finger 6 is provided with a shoulder 7 which engages the right-hand side of the insulating plate 3 as viewed in Fig. 3, and the left-hand end of each finger is threaded to receive a nut 8 which securely fastens the finger to the plate. Each finger 6 is also provided with a block 9 of electrical conducting material into which a bolt 10 is screwed for securing an electrical conductor to the finger. For reasons which will appear hereinafter, the electrical conductors are preferably in the form of a flexible cable 12 which is brought into the casing 1 through a suitable opening 11 located in the lower side of the casing. It will be noted that the opening 11 is tapered downwardly to enable the cable to be wedged in place by friction tape or some other suitable fastening means. After the cable is brought into the casing, the conductors are separated and each conductor is passed through one of the holes 4 and is fastened to the adjacent contact finger 6 by means of the associated bolt 10. To permit convenient access to the contact fingers for inspection, and for fastening the conductors to the fingers, the casing is provided with a removable cover 50.

The coupling member B is also preferably of substantially cylindrical configuration, and comprises a framework 13 attached by means of stay bolts 14 to an end plate 15. The framework 13 is enclosed within a removable cover 16 which is held in place by means of a suitable fastening device 53, and comprises two spaced spiders 17 and 18. The left-hand side of the spider 17 as viewed in Fig. 3, is provided with a cylindrical recess 17ª, and secured to the spider 17 within this recess in any suitable manner, as by studs 20, is a plate 19 of insulating material. The plate 19 is formed with a plurality of holes 22ª through which the contact fingers 6 of the coupling member A pass when the two coupling members A and B are joined. The right-hand side of the spider 18 is likewise provided with a cylindrical recess 18ª, and a second plate 21, also of insulating material, is secured to this spider within this recess. The plate 21 carries a plurality of contacting members each of which is adapted to engage a corresponding one of the contact fingers 6 of the coupling member A when the two coupling members A and B are joined thereby establishing electrical connections between the two coupling members. As here shown, each of the contacting members of the coupling member B comprises two spaced contact fingers 23 fastened, as by riveting, to the opposite sides of a square block 24 of electro-conducting material such as brass. Each of the blocks 24 partially enter one end of a suitable hole 25 in the plate 21, and is internally threaded to receive a stud 27 which extends through the associated hole 25 in the plate and securely clamps the associated block against a shoulder 25ª formed within the hole 25. A second or auxiliary stud 27ª is screwed into the head of each stud 27, and this latter stud serves as a convenient means of fastening the electrical conductors associated with the movable span of the drawbridge to the contact members, these conductors also preferably being in cable form for reasons which will appear presently.

It will be readily understood that a drawbridge is subjected to extreme and uneven variations in temperature, due for example, to changes in the ambient temperature, or to the sun's rays directed periodically to one or the other of its sides. These variations in temperature frequently cause warping of the spans as well as longitudinal expansion and contraction so that there is a considerable amount of relative movement of the spans both laterally and longitudinally. It is undesirable that the relative movements of the spans should be transmitted to the contacting members of the coupling device, and I therefore provide the coupling device with means independent of the contacting members for resisting all transverse stresses tending to cause lateral movement of one coupling member with respect to the other coupling member. This means also serves as a self-centering means whereby the fingers of the coupling member A are necessarily and accurately brought into perfect aligned relation with the contact springs of the coupling member B before electrical contact between the fingers and springs is possible, and comprises, in the form here shown, a heavy tapered plunger 34, preferably of steel, projecting axially from the coupling member A, and adapted to enter an axially disposed countersunk bore 35 in the frame 13 of the coupling member B. As best seen in Figs. 1 and 3, this plunger is made longer than the contact fingers 6 of the coupling member A, and the parts are so proportioned that it will enter the bore 35 in the frame 13 of the member B before the contact fingers 6 enter the holes 22ª in the plate 19, thus providing the means referred to hereinbefore for aligning the coupling members before contact between the complementary contacting members is possible.

The movement of the one coupling member with respect to the other coupling member necessary to bring about the alignment of the two coupling members when one of the spans becomes warped is permitted by providing the coupling member B with resilient supporting means. In the form here shown, this supporting means comprises a guide 29, which is secured to the movable span of the bridge near the coupling member B, and through which a pipe 28, forming both a support for the member B and a duct for protecting the cable leading to it, passes. This guide, as best seen in Fig. 2, is equipped with a plurality of plungers 36 which are free to move radially toward and away from the pipe, but which are each biased into engagement with the pipe by means of a spring 38. These members comprise a "self-centering" means for the pipe when only gravity influences the coupling member B as is the case when the coupling members are separated. When, however, through misalignment of the two members of the coupler, due for example, to warping of the approach span, the member A supported by the approach span produces a stress in the member B tending to move it in some direction in a vertical plane, the spring for the plunger of the guide which is subjected to this added stress yields to permit the new and desired alignment of the coupling members. On separation of the coupling members, the stressed spring acts to restore the coupling member B to its normal position and the pipe to the center of the guide. The pipe 28 is further supported by a second non-resilient guide 30 which is secured to the ties of the approach span as illustrated in Figs. 1 and 2.

In order to prevent longitudinal movement of one span with respect to the other span from producing relative longitudinal movement of the coupling members, I interpose between the coupling member B and the guide 29 a spring 54 which is adapted to be compressed when the coupling members are in their joined positions. With the parts arranged in this manner, it will be seen that if one span moves toward or away from the other span the spring 54 will hold the member B in proper engagement with the member A.

The coupling members A and B may be separated and joined by any suitable means. As here shown, the separation and joining of the coupling members is effected by means of a fluid pressure motor 39, the piston rod 40 of which is fastened to the left-hand end of the coupling member A in such manner that operation of the motor 39 will move the member A toward and away from the member B in an axial direction. The fluid pressure motor 39 may be controlled in any suitable manner forming no part of my present invention, and therefore not shown in the drawings.

The right-hand end of the pipe 28 is curved downwardly and enters a horizontal slot 42 in a plate 43 attached to the draw span as best seen in Figs. 1 and 2, thereby preventing rotation of the member B about the axis of its supporting pipe while permitting the desired longitudinal and radial movement of this coupling member pointed out hereinbefore. Similarly, a hollow circular boss or nipple 55 formed on the underside of the coupling member A is provided with lateral lugs 56 which are adapted to slide between guides 52 fastened to a plate 51, thereby preventing axial rotation of the coupling member A without interfering with its proper longitudinal movements. The plate 51 is secured to the ties of the approach span and acts as a support both for the coupling member A and the fluid pressure motor 39. It will be apparent, therefore, from the foregoing description that it is impossible for the coupling members to rotate thus insuring that the proper peripheral relation of the contacting members will be maintained.

In coupling devices of the type described, it is occasionally desirable to close or open a circuit on the draw span when the coupler is closed, which circuit is not required to be carried through the coupling device. For this purpose, I provide two contact springs 45 and 46 which are attached to the insulating plate 21, and which cooperate with a contact button 47 carried by, but insulated from a push rod 48. The push rod 48 extends through the plate 21, and is constantly biased toward the left as viewed in Fig. 3, by means of a spring 49. When the coupling members are joined, the right-hand end of the plunger 34 engages the push rod 48 and moves it toward the right to the position shown in Fig. 3, in which position the contact button 47 is out of engagement with the contact springs 45 and 46 so that contact 45—47—46 is open. When the coupling members are separated, however, the spring 49 moves the push rod toward the left, and the contact button 47 then engages the fingers 45 and 46, thereby closing the contact 45—47—46. It will be obvious that if it is desired to have the contact 45—47—46 closed instead of open when the couplers are joined, this may be accomplished by shaping the springs 45 and 46 differently.

Since the two members of the coupling device are each movable with respect to its supporting span, it follows that some form of flexible conductor is necessary from both of the coupling members to its supporting span. It is for this reason that the conductors are preferably arranged in the form of a flexible cable, and these cables will usually be disposed in a pendant loop between the coupling members and the associated span.

One advantage of a coupling device embodying my invention is that it is adaptable to any type of drawbridge and to any variation in alignment or longitudinal relation of the draw and approach spans that is permissible in such structures.

Other advantages of a coupling device embodying my invention are that it is compact, rugged and durable.

It should be particularly pointed out that while I have described a coupling device embodying my invention as being particularly suitable for use on drawbridges, it is not limited to this use, but may be used wherever it is desired to couple and uncouple electrical circuits between two relatively movable members or bodies, or wherever the use of a coupling device of this type will be advantageous.

Although I have herein shown and described only one form of electrical coupling device embodying my invention, it is understood that various changes and modifications may be made therein within the scope of the appended claims without departing from the spirit and scope of my invention.

Having thus described my invention, what I claim is:

1. Apparatus for supporting a coupling member comprising a pipe secured to said coupling member, two fixed spaced guides provided with means which receive said pipe in such manner that a limited amount of axial movement of said coupling member is permitted, the guide which is nearest said coupling member also being provided with a plurality of plungers movable radially toward and away from said pipe and biased into engagement with said pipe by means of springs, a compression spring interposed between said coupling member and the nearest guide, and means for preventing rotation of said coupling member about the axis of said pipe.

2. Apparatus for supporting a coupling member comprising a pipe rigidly secured to said coupling member, two fixed spaced guides provided with means which receive said pipe in such manner that a limited amount of axial movement of said coupling member is permitted, the guide which is nearest said coupling member also being provided with a plurality of plungers movable radially toward and away from said pipe and biased into engagement with said pipe by means of springs, a compression spring on said pipe between said coupling member and the nearest guide, a fixed plate provided with a slot, and means for preventing rotation of said coupling member about the axes of said pipe comprising a downwardly extending portion on the free end of said pipe which enters the slot in said fixed plate.

3. In combination with a drawbridge having two spans, a first coupling member provided with an axial bore, a pipe secured to said first coupling member, two spaced guides attached to the one span of said drawbridge and provided with means which receive said pipe in such manner that a limited amount of axial movement of said coupling member is permitted, the guide which is nearest said first coupling member also being provided with a plurality of plungers movable radially toward and away from said pipe and biased into engagement with said pipe by means of springs, a compressed spring on said pipe between said first coupling member and the guide which is nearest said first coupling member, means for preventing rotation of said first coupling member about its axis, a second coupling member, means for mounting said second coupling member on the other span of said drawbridge for axial movement into and out of engagement with said first member, means for preventing rotation of said second coupling member about its axis, a plunger extending from said second coupling member in an axial direction and arranged to cooperate with the bore in said first coupling member to align said coupling members when said second coupling member is moved into engagement with said first coupling member, a contact member secured to said first coupling member, and a contact finger secured to said second coupling member and arranged to slidably engage said second contact member after said plunger has entered said bore when said second coupling member is moved into engagement with said first coupling member.

In testimony whereof I affix my signature.

JOHN P. COLEMAN.